(12) United States Patent
Reddy et al.

(10) Patent No.: US 12,554,808 B2
(45) Date of Patent: *Feb. 17, 2026

(54) PUBLIC KEY EMBEDDED IN CONTENT FOR VERIFICATION OF AUTHORSHIP

(71) Applicant: Dell Products L.P., Round Rock, TX (US)

(72) Inventors: Karun P. Reddy, Austin, TX (US); Charles D. Robison, Buford, GA (US); Michael S. Gatson, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 77 days.

This patent is subject to a terminal disclaimer.

(21) Appl. No.: 18/499,817

(22) Filed: Nov. 1, 2023

(65) Prior Publication Data

US 2025/0139208 A1 May 1, 2025

(51) Int. Cl.
*G06F 21/16* (2013.01)
*G06F 21/62* (2013.01)

(52) U.S. Cl.
CPC .......... *G06F 21/16* (2013.01); *G06F 21/6209* (2013.01)

(58) Field of Classification Search
CPC .............................. G06F 21/16; G06F 21/6209
See application file for complete search history.

(56) References Cited

U.S. PATENT DOCUMENTS

| | | | |
|---|---|---|---|
| 11,790,694 B1* | 10/2023 | Raman | G06V 40/173 382/103 |
| 2003/0135748 A1* | 7/2003 | Yamada | H04M 1/675 713/193 |
| 2003/0188150 A1* | 10/2003 | Ohkado | H04N 1/32144 713/150 |
| 2003/0195851 A1* | 10/2003 | Ong | G06Q 30/02 705/50 |
| 2007/0256141 A1* | 11/2007 | Nakano | G06F 21/16 726/27 |
| 2013/0007471 A1 | 1/2013 | Grab | |
| 2017/0153117 A1* | 6/2017 | Kawase | H04N 21/4722 |
| 2021/0035589 A1 | 2/2021 | Hicks | |
| 2021/0112313 A1* | 4/2021 | Neumeier | H04N 21/4316 |
| 2021/0295381 A1* | 9/2021 | Wackerbauer | G06Q 30/0252 |
| 2024/0078078 A1 | 3/2024 | Hocker | |
| 2024/0196068 A1 | 6/2024 | Kumar | |
| 2025/0141702 A1 | 5/2025 | Robison | |

* cited by examiner

*Primary Examiner* — Carl G Colin
(74) *Attorney, Agent, or Firm* — Jackson Walker L.L.P.

(57) ABSTRACT

A method may include retrieving a media identifier for an item of content to be published, publishing a public key associated with the item of content to a database in order to store the public key in an entry associated with the media identifier, encrypting the media identifier with a private key of a public-private key pair including the public key to generate an encrypted media identifier, and during creation of the item of content, embedding the encrypted media identifier in the item of content.

8 Claims, 3 Drawing Sheets

PUBLIC KEY EMBEDDED IN CONTENT FOR VERIFICATION OF AUTHORSHIP

TECHNICAL FIELD

The present disclosure relates in general to information handling systems, and more specifically to embedding an encrypted media identifier within content for verification of authorship of the content.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Artificial intelligence (AI)-generated content is growing in popularity, often rendering it difficult to distinguish between real and AI-generated content and verify authorship of content. Accordingly, content authors may desire systems and methods to allow consumers of content to verify authorship of content consumed to ensure such consumed content is not spoofed, modified, or AI-generated.

SUMMARY

In accordance with the teachings of the present disclosure, the disadvantages and problems associated with verifying authorship of content may be reduced or eliminated.

In accordance with embodiments of the present disclosure, a method may include retrieving a media identifier for an item of content to be published, publishing a public key associated with the item of content to a database in order to store the public key in an entry associated with the media identifier, encrypting the media identifier with a private key of a public-private key pair including the public key to generate an encrypted media identifier, and during creation of the item of content, embedding the encrypted media identifier in the item of content.

In accordance with these and other embodiments of the present disclosure, a method may include during playback of an item of content, continuously capturing an encrypted media identifier embedded in the item of content. The method may also include continuously decrypting the captured encrypted media identifier and continuously comparing the decrypted media identifier to a media identifier stored in a database and associated with the item of content in order to verify authorship of the item of content.

In accordance with these and other embodiments of the present disclosure, an article of manufacture may include a computer readable medium and computer-executable instructions carried on the computer readable medium, the instructions readable by a processor, the instructions, when read and executed, for causing the processor to retrieve a media identifier for an item of content to be published, publish a public key associated with the item of content to a database in order to store the public key in an entry associated with the media identifier, encrypt the media identifier with a private key of a public-private key pair including the public key to generate an encrypted media identifier, and during creation of the item of content, embed the encrypted media identifier in the item of content.

In accordance with these and other embodiments of the present disclosure, an article of manufacture may include a computer readable medium and computer-executable instructions carried on the computer readable medium, the instructions readable by a processor, the instructions, when read and executed, for causing the processor to during playback of an item of content, continuously capture an encrypted media identifier embedded in the item of content, continuously decrypt the captured encrypted media identifier, and continuously compare the decrypted media identifier to a media identifier stored in a database and associated with the item of content in order to verify authorship of the item of content.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
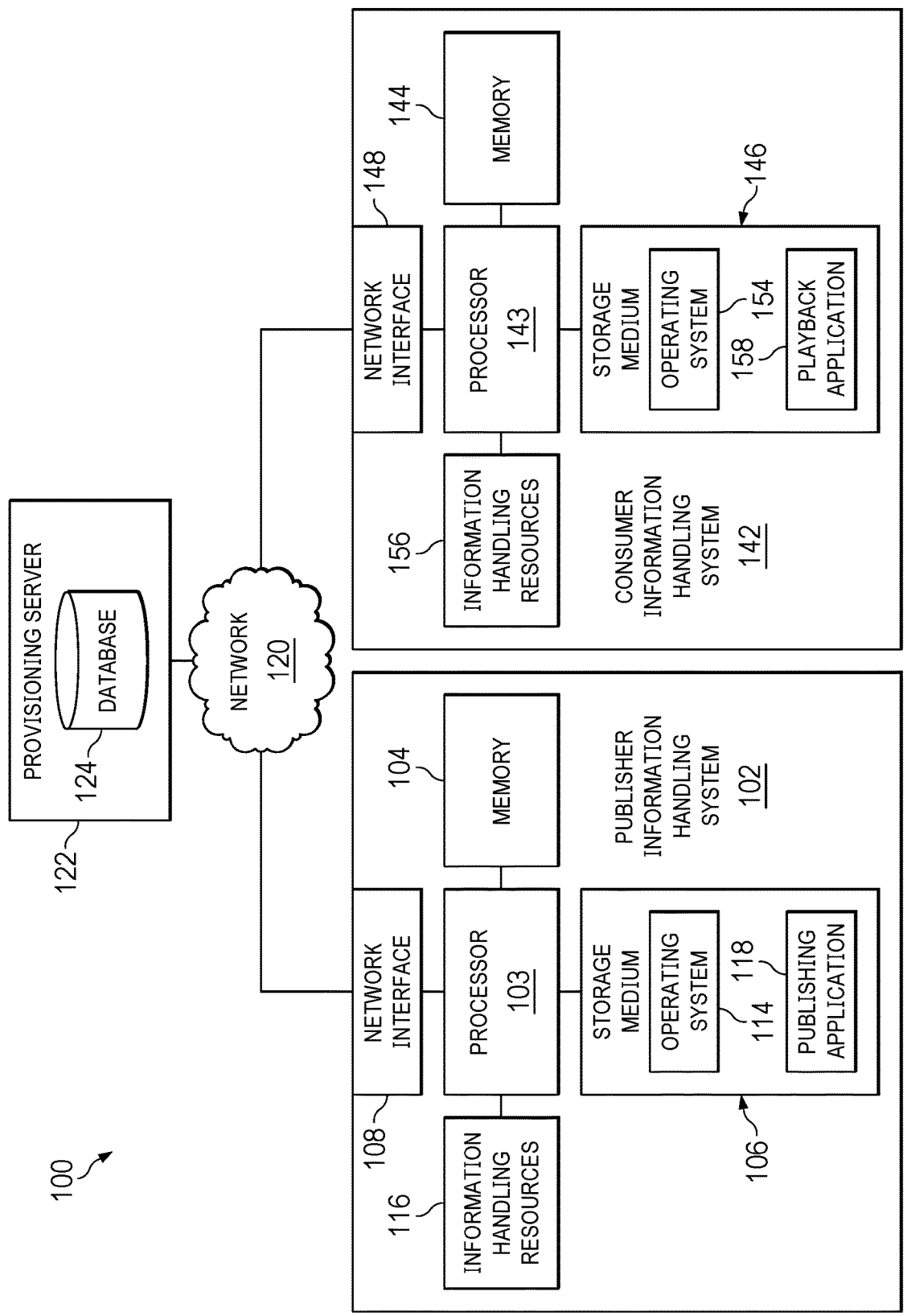
FIG. 1 illustrates a block diagram of an example system for embedding a public key in content for verification of authorship, in accordance with certain embodiments of the present disclosure.
Figure 2:
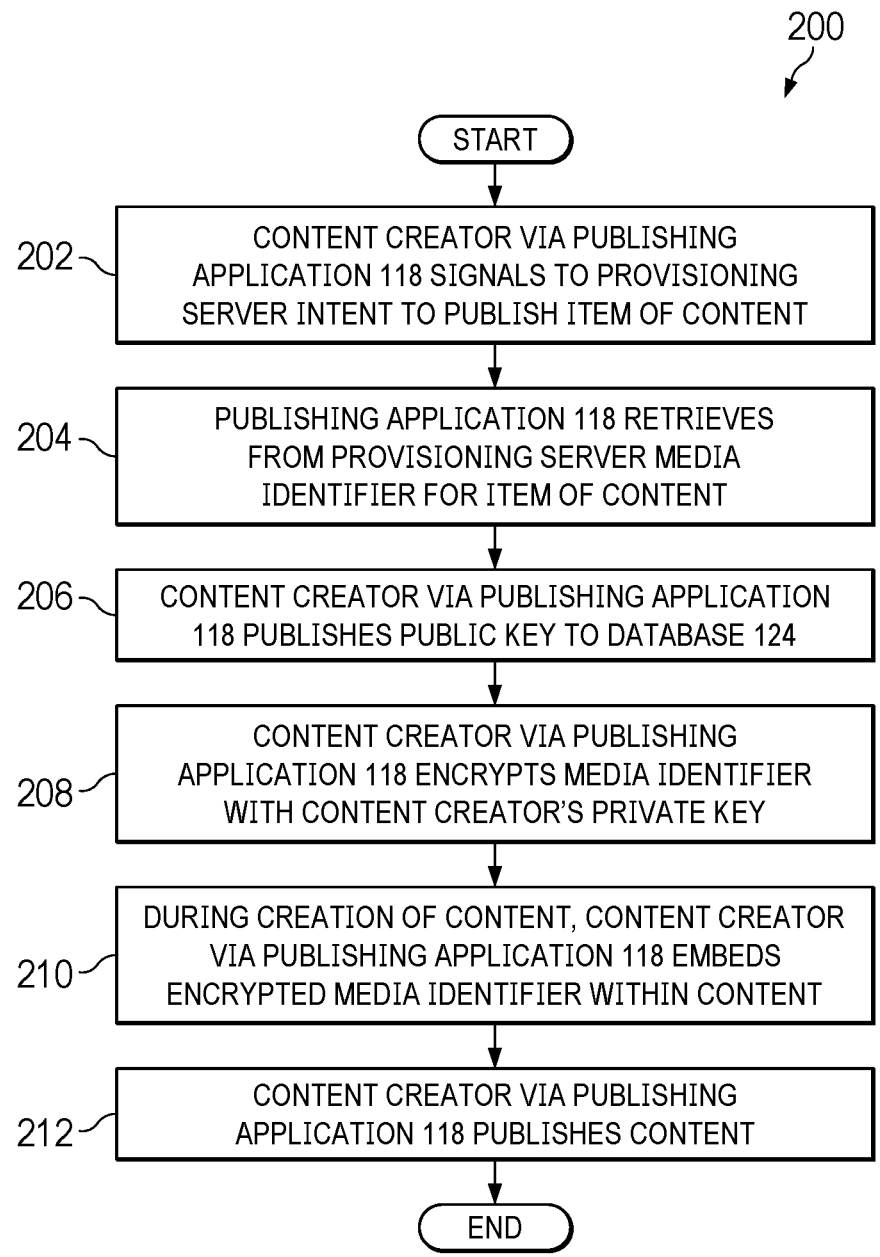
FIG. 2 illustrates a flow chart of an example method for publishing content with an embedded encrypted media identifier for the content, in accordance with embodiments of the present disclosure.
Figure 3:
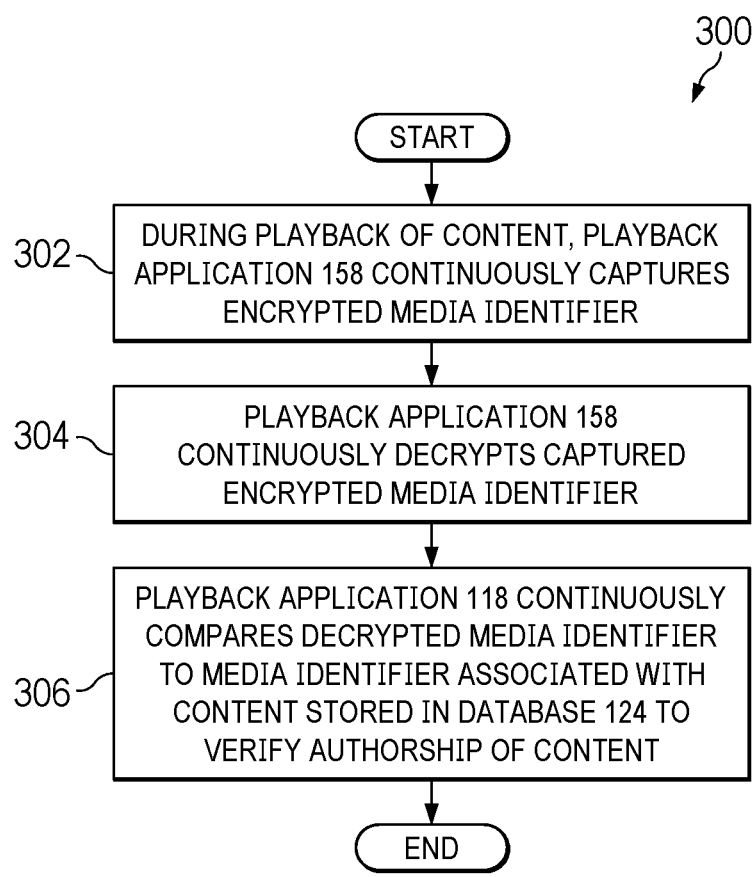
FIG. 3 illustrates a flow chart of an example method for verifying content with an encrypted media identifier embedded in the content, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more busses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, BIOSs, buses, memories, I/O devices and/or interfaces, storage resources, network interfaces, motherboards, and/or any other components and/or elements of an information handling system.

FIG. 1 illustrates a block diagram of an example system 100 for embedding a public key in content for verification of authorship, in accordance with certain embodiments of the present disclosure. As shown in FIG. 1, system 100 may include a publisher information handling system 102 communicatively coupled to a provisioning server 122 via a network 120 and a consumer information handling system 142 communicatively coupled to provisioning server 122 via network 120.

In some embodiments, publisher information handling system 102 may comprise a server. In other embodiments, publisher information handling system 102 may be a personal computer (e.g., a desktop computer, a laptop, notebook, tablet, handheld, smart phone, personal digital assistant, etc.). As depicted in FIG. 1, publisher information handling system 102 may include a processor 103, a memory 104 communicatively coupled to processor 103, a storage medium 106 communicatively coupled to processor 103, a network interface 108 communicatively coupled to processor 103, and one or more other information handling resources 116 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage medium 106, and/or another component of publisher information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to publisher information handling system 102 is turned off.

Storage medium 106 may be communicatively coupled to processor 103 and may include any system, device, or apparatus operable to store information processed by processor 103. Storage medium 106 may include, for example, network attached storage, one or more direct access storage devices (e.g., hard disk drives), and/or one or more sequential access storage devices (e.g., tape drives). As shown in FIG. 1, storage medium 106 may have stored thereon an operating system 114 and publishing application 118.

Operating system 114 may be any program of executable instructions, or aggregation of programs of executable instructions, configured to manage and/or control the allocation and usage of hardware resources such as memory, CPU time, disk space, and input and output devices, and provide an interface between such hardware resources and application programs hosted by operating system 114. Active portions of operating system 114 may be transferred to memory 104 for execution by processor 103.

Publishing application 118 may be any program of executable instructions, or aggregation of programs of executable instructions, configured to run on top of operating system 114 and assist and/or enable a user of publisher information handling system 102 to publish content for consumption by others. For example, content may include video, audio, multimedia, photography, drawings, portraits, written works, and/or any other work of authorship. In these and other embodiments, content may include both recorded content or live broadcast content. In some embodiments, publishing application 118 may comprise and/or may be configured to interoperate with executable instructions for assisting and/or enabling the user to author the content.

Network interface 108 may comprise any suitable system, apparatus, or device operable to serve as an interface between publisher information handling system 102 and one or more other information handling systems. Network interface 108 may enable publisher information handling system 102 to communicate using any suitable transmission protocol and/or standard. In these and other embodiments, network interface 108 may comprise a network interface card, or "NIC."

Generally speaking, information handling resources 116 may include any component system, device or apparatus of publisher information handling system 102, including without limitation processors, buses, computer-readable media, input-output devices and/or interfaces, storage resources, network interfaces, motherboards, electro-mechanical devices (e.g., fans), displays, and/or power supplies.

In addition to processor 103, memory 104, storage medium 106, network interface 108, and information handling resources 116, publisher information handling system 102 may include one or more other information handling resources.

Network 120 may comprise a network and/or fabric configured to couple publisher information handling system 102 and provisioning server 122 to each other and/or one or more other information handling systems. In these and other embodiments, network 120 may include a communication infrastructure, which provides physical connections, and a management layer, which organizes the physical connections and information handling systems communicatively coupled to network 120. Network 120 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 120 may transmit data via wireless transmissions and/or wire-line transmissions using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 120 and its various components may be implemented using hardware, software, or any combination thereof.

Provisioning server 122 may comprise an information handling system, and may include any system, device, or apparatus configured to facilitate and manage a database 124 that stores entries relating media identifiers for published works to public keys associated with the media identifiers, as described in greater detail below.

In some embodiments, consumer information handling system 142 may comprise a server. In other embodiments, consumer information handling system 142 may be a personal computer (e.g., a desktop computer, a laptop, notebook, tablet, handheld, smart phone, personal digital assistant, etc.). As depicted in FIG. 1, consumer information handling system 142 may include a processor 143, a memory 144 communicatively coupled to processor 143, a storage medium 146 communicatively coupled to processor 143, a network interface 148 communicatively coupled to processor 143, and one or more other information handling resources 156 communicatively coupled to processor 143.

Processor 143 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 143 may interpret and/or execute program instructions and/or process data stored in memory 144, storage medium 146, and/or another component of consumer information handling system 142.

Memory 144 may be communicatively coupled to processor 143 and may include any system, device, or apparatus configured to retain program instructions and/or data for a period of time (e.g., computer-readable media). Memory 144 may include RAM, EEPROM, a PCMCIA card, flash memory, magnetic storage, opto-magnetic storage, or any suitable selection and/or array of volatile or non-volatile memory that retains data after power to consumer information handling system 142 is turned off.

Storage medium 146 may be communicatively coupled to processor 143 and may include any system, device, or apparatus operable to store information processed by processor 143. Storage medium 146 may include, for example, network attached storage, one or more direct access storage devices (e.g., hard disk drives), and/or one or more sequential access storage devices (e.g., tape drives). As shown in FIG. 1, storage medium 146 may have stored thereon an operating system 154 and playback application 158.

Operating system 154 may be any program of executable instructions, or aggregation of programs of executable instructions, configured to manage and/or control the allocation and usage of hardware resources such as memory, CPU time, disk space, and input and output devices, and provide an interface between such hardware resources and application programs hosted by operating system 154. Active portions of operating system 154 may be transferred to memory 144 for execution by processor 143.

Playback application 158 may be any program of executable instructions, or aggregation of programs of executable instructions, configured to run on top of operating system 154 and enable playback (e.g., viewing, listening, etc.) of content (e.g., video, audio, multimedia, photography, drawings, portraits, written works, and/or any other work of authorship) at consumer information handling system 142. Playback of content may include playback/streaming of already-recorded content and/or playback/live-streaming of real-time broadcasted content.

Network interface 148 may comprise any suitable system, apparatus, or device operable to serve as an interface between consumer information handling system 142 and one or more other information handling systems. Network interface 148 may enable consumer information handling system 142 to communicate using any suitable transmission protocol and/or standard. In these and other embodiments, network interface 148 may comprise a network interface card, or "NIC."

Generally speaking, information handling resources 156 may include any component system, device or apparatus of consumer information handling system 142, including without limitation processors, buses, computer-readable media, input-output devices and/or interfaces, storage resources, network interfaces, motherboards, electro-mechanical devices (e.g., fans), displays, and/or power supplies.

In addition to processor 143, memory 144, storage medium 146, network interface 148, and information handling resources 156, consumer information handling system 142 may include one or more other information handling resources.

In addition to publisher information handling system 102, network 120, provisioning server 122, and consumer information handling system 142, system 100 may include any other suitable components, including without limitation other information handling systems.

In operation, a content creator at publisher information handling system 102 may signal, via publishing application 118, his/her intent to publish an item of content to provisioning server 122, and provisioning server 122 may provide to publishing application 118 a media identifier for the item of content. The creator may also publish his/her public key to database 124, wherein database 124 may store the public key in an entry associated with the media identifier for the content, to enable later verification of the content. The public key may be part of a public-private key pair, wherein the private key of the public-private key pair is maintained by the content creator.

The content creator may encrypt the media identifier with the content creator's private key. During creation of the content, the content creator may embed the encrypted media identifier in the content. In some embodiments, the encrypted media identifier may be embedded in the content in a manner imperceptible to a consumer (e.g., listener, viewer, reader) of the content. For example, for content having audio, publishing application 118 may repeatedly overlay the encrypted media identifier in ultrasonic frequencies on the audio track of the content.

At a later instant, playback application 158 may, during playback of the content, continuously capture the encrypted media identifier and decrypt the captured encrypted media identifier to compare the decrypted media identifier to the media identifier associated with the content stored in database 124. A match between the decrypted media identifier and the media identifier stored in database 124 may verify authorship of the content. Further, unauthorized changes to the content may be detected by errors and/or disruptions present in the content, such as errors and/or disruptions present in an audio track of the content.

FIG. 2 illustrates a flow chart of an example method 200 for publishing content with an embedded encrypted media identifier for the content, in accordance with embodiments of the present disclosure. According to certain embodiments, method 200 may begin at step 202. As noted above, teachings of the present disclosure may be implemented in a variety of configurations of publisher information handling system 102 as shown in FIG. 1. As such, the preferred initialization point for method 200 and the order of the steps comprising method 200 may depend on the implementation chosen. In these and other embodiments, method 200 may be implemented as firmware, software, applications, functions, libraries, or other instructions.

At step 202, a content creator, for example, via publishing application 118, may signal to provisioning server 122 his/her intent to publish an item of content. At step 204, publishing application 118 may retrieve from provisioning server 122 a media identifier for the item of content. At step 206, the creator, for example via publishing application 118, may publish his/her public key to database 124, wherein database 124 may store the public key in an entry associated with the media identifier for the content, to enable later verification of the content. The public key may be part of a public-private key pair, wherein the private key of the public-private key pair is maintained by the content creator.

At step 208, the content creator may, for example via publishing application 118, encrypt the media identifier with the content creator's private key. At step 210, during creation of the content, the content creator may, via publishing application 118, embed the encrypted media identifier in the content. In some embodiments, the encrypted media identifier may be embedded in the content in a manner imperceptible to a consumer (e.g., listener, viewer, reader) of the content. For example, for content having audio, publishing application 118 may repeatedly overlay the encrypted media identifier in ultrasonic frequencies on the audio track of the content. At step 212, the content creator may, for example via publishing application 118, publish the content (e.g., make the content available for download or otherwise available for consumption by a consumer).

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method implemented 200 may be using publisher information handling system 102, components thereof, or any other system such as those shown in FIG. 1 operable to implement method 200. In certain embodiments, method 200 may be implemented partially or fully in software and/or firmware embodied in computer-readable media.

FIG. 3 illustrates a flow chart of an example method 300 for verifying content with an encrypted media identifier embedded in the content, in accordance with embodiments of the present disclosure. According to certain embodiments, method 300 may begin at step 302. As noted above, teachings of the present disclosure may be implemented in a variety of configurations of consumer information handling system 142 as shown in FIG. 1. As such, the preferred initialization point for method 300 and the order of the steps comprising method 300 may depend on the implementation chosen. In these and other embodiments, method 300 may be implemented as firmware, software, applications, functions, libraries, or other instructions.

At step 302, after an item of content has been published, playback application 158 may (e.g., responsive to a consumer signaling a desire to consume the content), during playback of the content, continuously capture the encrypted media identifier (e.g., from an audio track of the content). At step 304, playback application 158 may continuously decrypt the captured encrypted media identifier. At step 306, playback application 118 may continuously compare the decrypted media identifier to the media identifier associated with the content stored in database 124 to verify authorship of the content. A match between the decrypted media identifier and the media identifier stored in database 124 may authenticate authorship of the content. Further, unauthorized changes to the content may be detected by errors and/or disruptions present in the content, such as errors and/or disruptions present in an audio track of the content.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using consumer information handling system 142, components thereof, or any other system such as those shown in FIG. 1 operable to implement method 300. In certain embodiments, method 300 may be implemented partially or fully in software and/or firmware embodied in computer-readable media.

In the case that the content has been changed, edited, or tampered with, there may be an interruption of the ultrasonic audio overlay. In such an instance, playback application 158 may be able to detect breaks in continuity, breaks in order, and/or errors in decoding of the ultrasonic audio that, in drastic cases may prevent the media identifier from being decoded or in more subtle cases, playback application 158 may detect discontinuities by audio analysis known in the art (e.g., audible artifacts such as pops, audio cracks, spikes).

In the case the media is spoofed or otherwise media has been published in such a way as to pretend to be authentically created by an author with the intent of persuading the user that it is in fact legitimate (e.g., to spread misinformation, to defame character or characters, to gain ill-placed notoriety, to sell products through misguided marketing), playback application 158 may not be able to decode the media identifier using the public key (because the adversary did not have the matching private key in their possession).

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A method comprising:
   retrieving a media identifier for an item of content to be published;
   publishing a public key associated with the item of content to a database in order to store the public key in an entry associated with the media identifier;
   encrypting the media identifier with a private key of a public-private key pair including the public key to generate an encrypted media identifier; and
   during creation of the item of content, embedding the encrypted media identifier in the item of content by repeatedly overlaying the encrypted media identifier in ultrasonic frequencies on an audio track of the item of content.

2. A method comprising:
   during playback of an item of content, continuously capturing an encrypted media identifier embedded in the item of content, wherein the encrypted media identifier is embedded by repeatedly overlaying the encrypted media identifier in ultrasonic frequencies on an audio track of the item of content
   continuously decrypting the captured encrypted media identifier; and continuously comparing the decrypted media identifier to a media identifier stored in a database and associated with the item of content in order to verify authorship of the item of content.

3. The method of claim 2, further comprising detecting unauthorized changes to the item of content based on errors and/or disruptions present in playback of the item of content.

4. The method of claim 2, wherein the encrypted media identifier is embedded in the item of content in a manner imperceptible during playback to a consumer of the item of content.

5. An article of manufacture comprising:
   a non-transitory computer readable medium; and
   computer-executable instructions carried on the computer readable medium, the instructions readable by a processor, the instructions, when read and executed, for causing the processor to:
   retrieve a media identifier for an item of content to be published;
   publish a public key associated with the item of content to a database in order to store the public key in an entry associated with the media identifier;
   encrypt the media identifier with a private key of a public-private key pair including the public key to generate an encrypted media identifier; and
   during creation of the item of content, embed the encrypted media identifier in the item of content by repeatedly overlaying the encrypted media identifier in ultrasonic frequencies on an audio track of the item of content.

6. An article of manufacture comprising: a non-transitory computer readable medium; and computer-executable instructions carried on the computer readable medium, the instructions readable by a processor, the instructions, when read and executed, for causing the processor to:
   during playback of an item of content, continuously capture an encrypted media identifier embedded in the item of content, wherein the encrypted media identifier is embedded by repeatedly overlaying the encrypted media identifier in ultrasonic frequencies on an audio track of the item of content;
   continuously decrypt the captured encrypted media identifier;

and continuously compare the decrypted media identifier to a media identifier stored in a database and associated with the item of content in order to verify authorship of the item of content.

7. The article of claim 6, further comprising detecting unauthorized changes to the item of content based on errors and/or disruptions present in playback of the item of content.

8. The article of claim 6, wherein the encrypted media identifier is embedded in the item of content in a manner imperceptible during playback to a consumer of the item of content.

* * * * *